Dec. 22, 1936.                N. C. BUTLER                2,065,050
                    SHIPPING CRATE OR BOX FOR TILES
                    Filed Nov. 20, 1934      3 Sheets-Sheet 1

INVENTOR
NOBLE C. BUTLER.
BY
Robert Cobb
ATTORNEYS

Dec. 22, 1936.   N. C. BUTLER   2,065,050
SHIPPING CRATE OR BOX FOR TILES
Filed Nov. 20, 1934   3 Sheets-Sheet 2
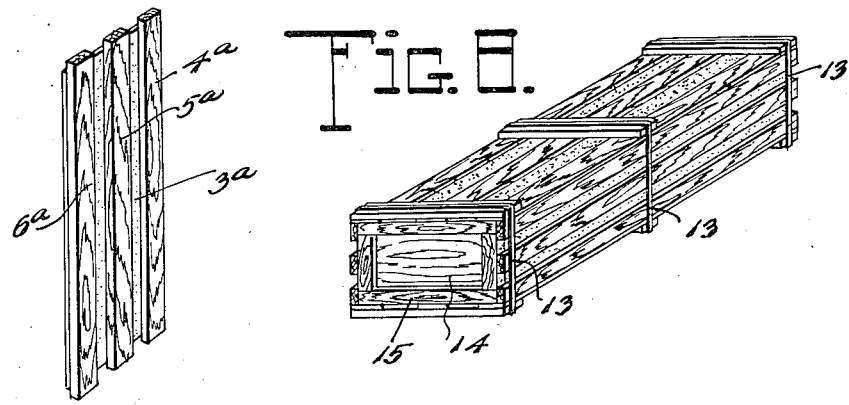
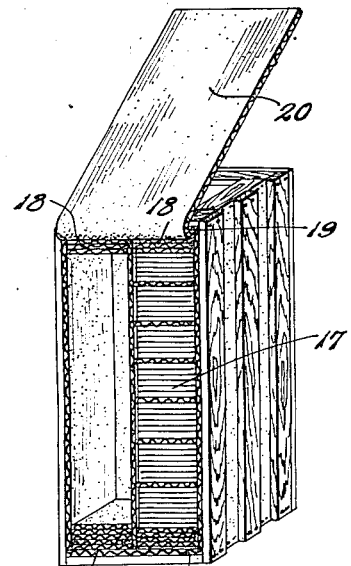
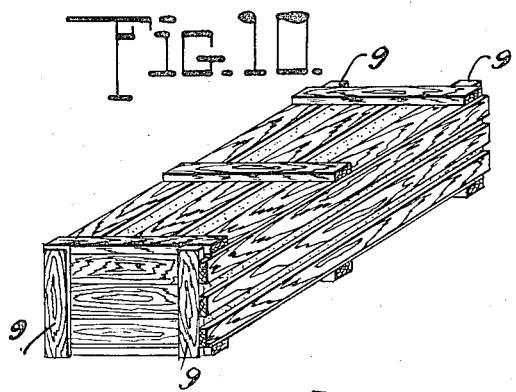
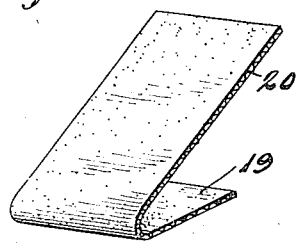
INVENTOR
NOBLE C. BUTLER
BY
*Robb & Robb*
ATTORNEYS Dec. 22, 1936. N. C. BUTLER 2,065,050
SHIPPING CRATE OR BOX FOR TILES
Filed Nov. 20, 1934 3 Sheets—Sheet 3
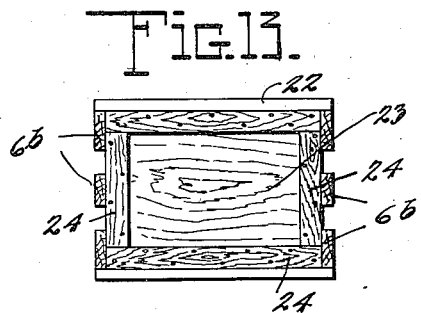
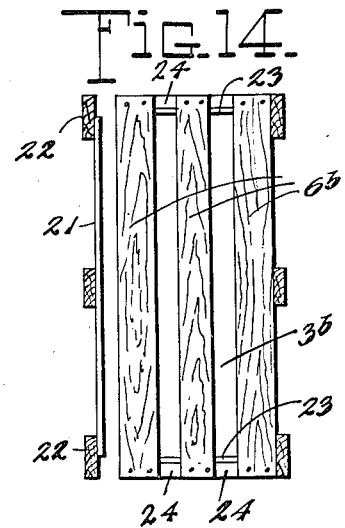
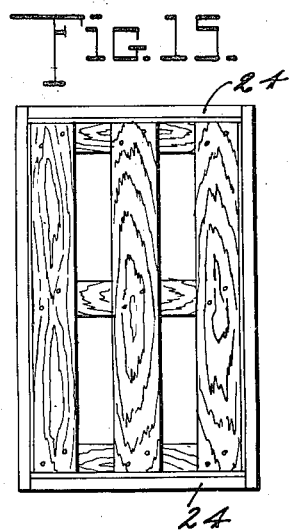
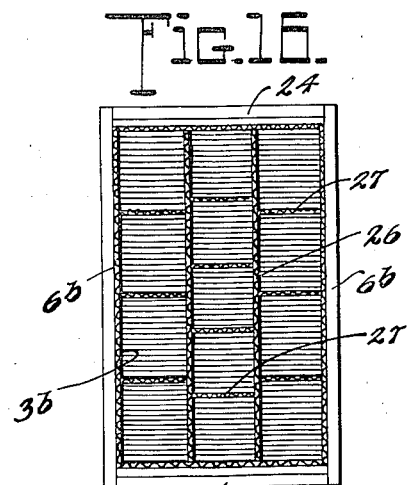
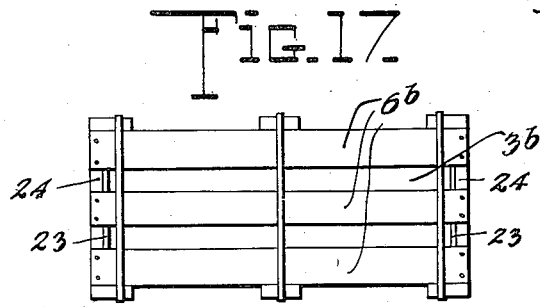
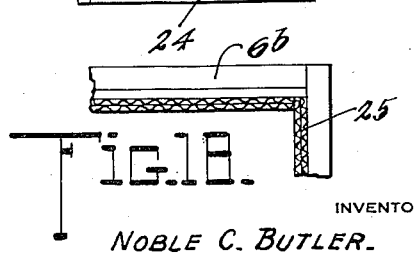
INVENTOR
NOBLE C. BUTLER.
BY
ATTORNEYS Patented Dec. 22, 1936

2,065,050

UNITED STATES PATENT OFFICE 2,065,050

SHIPPING CRATE OR BOX FOR TILES

Noble C. Butler, Anderson, Ind., assignor to The National Tile Company, Anderson, Ind., a corporation Application November 20, 1934, Serial No. 753,988

4 Claims. (Cl. 217—12)

The customary manner in which tiles were shipped before my invention involves the packing of the tiles in contact with one another at adjacent sides and at their edges, grouped substantially in a solid mass and disposed in a barrel so as to occupy largely the central area of the latter, breakage of the tiles being intended to be prevented by packing around them adjacent to the sides and ends of the barrel quantities of shavings and/or sawdust. In practice, however, it is found that no matter how hard the shavings or sawdust are packed in between the barrel walls and the mass of tiles, if the barrel is allowed to sit in one position a number of days, as for instance when being shipped considerable distances, or held at the place or site where the tiles are to be laid for some days preliminary to the tile setting operation, the sawdust or shavings settle, permitting the tile to move inside the barrel or receptacle. The fact that the tiles are in contact with or touch one another when so packed results often in chipping of edges and/or corners of a certain proportion of the tiles. Also, when the sawdust or shavings settle in the manner stated, creating extra space permitting movement of the tiles, further chipping and sometimes breakage of the tiles ensues in the movement of the barrel in which they are packed or contained.

The said previous method of packing is not only disadvantageous for the reason above set forth, but in an ordinary barrel of tile approximately sixteen pounds of shavings are required for the packing, and this is five per cent of the total weight of the shipment, so that freight has to be paid upon the packing material such as shavings or sawdust, giving rise to considerable expense on this item alone. It is an object of the invention to reduce this item of expense by employing a different kind of container for the tile, and novel construction and method for cushioning the tiles and spacing them in the container.

Another disadvantage of the barrel method of packing tile is incident to the fact that a packed barrel will weigh a very considerable amount, approximating 290 lbs., and this is a greater weight than one man can handle. Under these conditions it is very common, therefore, at places where no elevator or hoisting equipment is available, for the barrel of tile when opened to be kept on the ground floor and small amounts of the tile carried to the place where the tile is to be set. This is a time taking and costly method of operation, and, furthermore, the shavings or sawdust create unnecessary dirt and a fire hazard. The removal of the shavings or sawdust is an added expense, obviously.

Again, in the barrel method of packing, the head of the barrel is nailed in place, and in removing it, unless all nails are pulled, there is the liability of scratching of the hands or arms of the person removing the tile from the barrel, and sometimes projecting nails are liable to scratch the tiles.

Another method of packing tile heretofore employed has been to use a corrugated carton having a cushioning function for the protection of the tile, and while this affords a lightening of the weight, it is disadvantageous because the cartons often get wet and become structurally weak and go to pieces. Furthermore, owing to the weight limitation for corrugated cardboard cartons or boxes, a comparatively small amount of tile only can be shipped in each package.

With the foregoing in view, therefore, it has been a primary objective of the present invention to devise a new form of packaging means in the nature of a combination box or crate and corrugated cardboard carton structure. In this way there is attained the advantage of the outside strength of a barrel and the interior packing and protection of a carton. This has been found to materially cheapen the methods used heretofore for shipping tile, and affords more protection against the breakage or chipping of the tiles, as well as a superior method for the handling of tiles which have to be soaked or wet in reference to the absorbent bodies thereof prior to emplacement or setting.

It has been found almost impossible in the packing of tiles in barrels to insure cushioning of the tiles which are flatwise in contact with each other in such a manner as to hold them tightly in such contact. By the present method such cushioning is successfully accomplished.

Generally speaking, the present invention, by which are eliminated the disadvantages previously referred to, involves the provision of a crate structure, the sides, bottom, and top of which may comprise slats or spaced boards somewhat after the manner of the usual type of crates that are employed for the shipment of fruit. It is contemplated according to the invention, however, in preparing the crate parts for assemblage, to glue or otherwise adhesively attach the slats of a side or bottom of a crate to a corrugated or cushioned board member, with the slats properly spaced with relation to each other. Such a side with the slats constitutes a unit, and with a series of such units for the sides, top, and bottom of the crate, together with opposite end members which may be solid boards with cleats, it is possible to assemble a crate of such units very quickly, nail the sides and bottom together when so assembled to provide an open receptacle of strong, rigid nature, the corrugated board or cushion members constituting the lining of the receptacle for cushioning the tiles which are placed therein. Separated partitions of similar corrugated material that are disposed both longitudinally and transversely of the receptacle for effective protective packing of the tiles in small separated masses when disposed therein, are used.

The receptacle cover or top according to the invention is separate from the sides and bottom and ends, and is intended to be laid into a closing position relatively to the receptacle body and to be attached in place by metal bands without nailing in place at all. This eliminates the difficulties of removing such cover or top member by having to take out nails that are always difficult to pull. Nevertheless, the banding method involving the passing of two or three bands around the crate with the cover in place, is extremely effective to provide a strong closure attachment for the open side of the receptacle when the tiles have been packed therein. Likewise, once the cover or top is removed, the receptacle may be employed as a display container for the tiles, as a holder for the tiles convenient to the tile setter preliminary to the setting operation, and as a holder for the tiles when they are submerged in water if it is desired to soak the absorbent bodies thereof, as in the case of glazed tiles where such soaking is required.

Referring to the drawings—

Figure 7 shows the type of side member for the modification of Figure 5.

Figure 8 illustrates one of the constructions of my crate as when fully banded with its contents of tiles or the like packed therein.

Figure 10 is a perspective view of one of my forms of crate with the top in position just previous to banding.

Figure 11 is a perspective view showing one of the crates of my invention as when employed as a storage bin, one tier of tiles having already been removed therefrom.

Figure 12 is a perspective view of a front cushion closure member.

Figure 13 is an end view of another modified form of the invention.

Figure 14 is a side view of the modification of Figure 13.

Figure 15 is a top plan view of the crate of Figure 13, the top or cover removed.

Figure 16 illustrates how the crate may be used as a bin after the top has been detached, the bin being useful for storage and other purposes.

Figure 17 is a view of the complete crate as shown in Figure 13, the bands applied.

Figure 18 is a fragmentary corner view of the crate showing the double corrugated cushion wall member structure.

Figure 4:
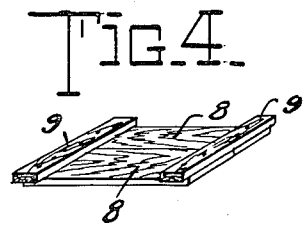
Figure 4 is a perspective view of one type of end member which I may employ.

In a general manner my crate constructions, as previously stated, somewhat resemble ordinary crates when superficially viewed. It is notable, however, referring to Figures 1 to 4 inclusive, that the sides of the crate are made of two slats or boards 1 and 2 which are assembled on and glued or adhesively applied to the outer side of the cushion side member 3. The boards 1 are accurately spaced if their outer edges are about flush with the adjacent edges of the cushioned side 3, the latter being preferably made of corrugated cardboard of a known type at present common in the trade. The bottom of the crate is of substantially the same construction as the side 2 illustrated as a unit in Figure 2, but will preferably, though not necessarily, be equipped with three boards or slats 4, 5, and 6, applied to the bottom cushion member 7 in the same manner as the boards 1 and 2 are secured to the part 3. The end sections or members of the crate will be preferably made solid of boards 8, as seen in Figure 4, attached together by cross cleats of wood, designated 9. The end members may be equipped with a cushion section attached thereto with glue or the like, or they may be without such section, and the latter simply placed in the crate at the inner side of the end members as they are illustrated in Figure 1, preliminary to packing the tiles therein.

Figure 1:
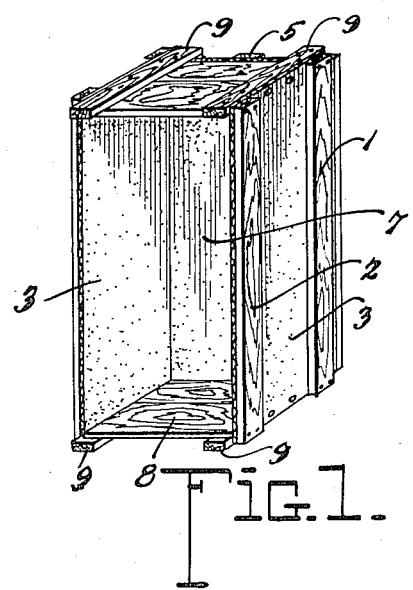
Figure 1 is a perspective view of a crate embodying my invention, showing particularly the side, bottom, and end structure, the top or cover and interior partitions omitted.
Figure 6:
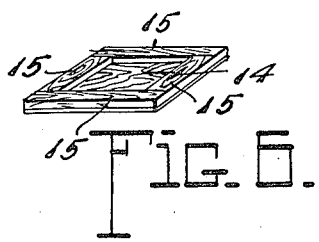
Figure 6 shows the type of end member employed for the modification of Figure 5.
Figure 9:
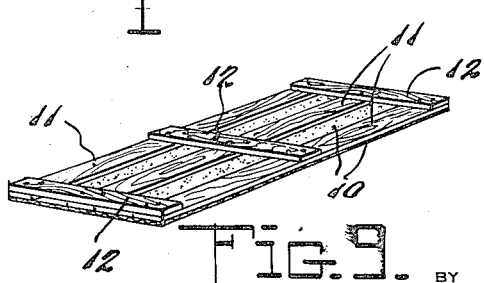
Figure 9 is a perspective view of the cover or top with the cross cleats, the ends of which are adapted to overlap the sides to extend flush therewith.

In the construction of Figure 1, the cleats 9 of the end members shown in Figure 4 project beyond the upper and lower edges of the end members, and a cover member of the kind shown in Figure 9 may be employed, the same being seated upon the upper boards 2 of the sides and overlapping them and being disposed between the opposite pairs of cleats 9 of the opposite end members 8. As seen in Figure 9, the top or cover member may be made of a cushion section 10 forming the body thereof, a plurality of boards or slats 11 glued thereto, and cross cleats 12 at the ends and middle.

Now in the assembling of the crate made up of the parts that have been so far set forth, the sides and bottom comprising the cushion members or bodies and the boards applied thereto are each a unit including said parts. The cushion members 3 and 7 form templates which properly position the boards or slats and hold them in position when the sides and bottom are handled as units, and so it is that the ends, sides, and bottom may be quickly assembled and the sides and bottom quickly nailed as units to the ends. Thereupon, the top or cover member comprising the parts 10, 11, and 12 will be placed in position over the open portion of the crate after the tiles have been packed therein in a manner to be later set forth. There is no nailing of the top or cover to the remaining portion of the crate, for reasons previously mentioned herein, and the top is secured in place by applying clamping bands 13, such as are shown in Figure 8. These bands eliminate the nailing operation, avoid liability of nails chipping any tiles when driven in place, and avoid likelihood of scratching of the person who handles the crate in opening or otherwise. The cross members 12 are preferably nailed to the boards or slats 11 after the latter are glued to the cushion member 10 of the cover, this facilitating the assemblage of these parts because the boards 11 may be readily positioned with nothing more than the eye of the builder to enable him to locate them properly on the member 10.

Figure 5:
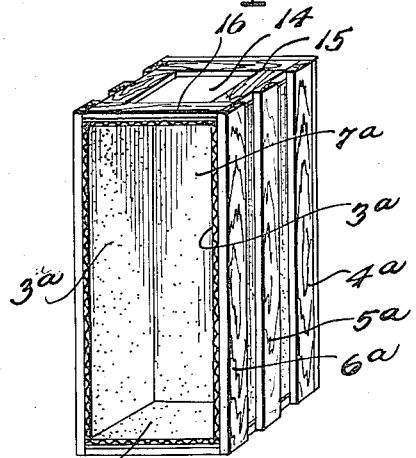
Figure 5 is an illustration of a modified construction.

In Figure 5 a modification of the invention is availed of, wherein the end members may comprise the solid boards 14 with the edge cross members or cleats 15. The end cushion member may or may not be directly applied by adhesion to the board 14. In the construction of Figure 5 the sides and bottom at the ends will overlap the end members, but the cushion portions 3a and 7a of said sides and bottom are foreshortened somewhat as compared with the construction of Figure 1, so that said cushion members merely abut at the ends with the cushion members 16 of the end members 14—15.

Figure 2:
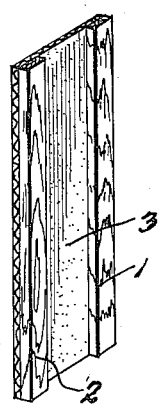
Figure 2 is a perspective view of one of the side units of the crate, the same being of cushion construction.
Figure 3:
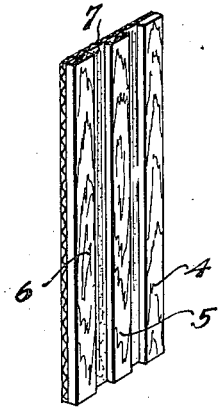
Figure 3 is a view similar to Figure 2, showing the bottom unit.

The constructions of the crates as shown in Figures 8 and 10 illustrate the manner in which the cover of Figure 9 may be positioned between the end cleats 9 just previous to the banding operation which involves the passing of the bands 13 around the sides, top, and bottom elements in the manner shown in Figure 8. According to the construction of the crate of Figures 5 and 11, the sides will be made according to the unit forms illustrated in Figure 7, wherein the boards 4a, 5a, and 6a project slightly beyond the ends of the cushion member 3a. In this instance, of course, the sides are made up of three slats or boards instead of two as shown in Figure 2.

It is to be understood that it is within the purview of the invention to make the sides, bottom, and top members in units comprising a cushion member and any suitable number of boards or slats.

The mode of packing tiles in the crate is illustrated in Figure 11. They are packed in small lots separated by horizontal and vertical partitions of the cushion type corrugated cardboard, so that if several rows or tiers of tiles are to be crated, the lots are separated at their edges, only a relative few contacting on their flat faces. Special cushioning layers 18 of the corrugated board are located between the ends of the crate and the nearest tiles to absorb the shock of depositing the crate on either end as often done.

One of the end cushion wall members 19 has an extending front cushion closure to cover the edges of the tiles below the cover as seen at 20 in Figure 11, wherein it is shown upraised before use. Its advantages are quite apparent.

The modification of the invention shown in Figures 13 to 15 involves primarily the provision of the sides made up of assembled side boards or slats 6b and contacting on a cushion wall 3b substantially as before set forth. In this construction, however, the top and bottom features of the receptacle will embody a construction of slightly shortened slats or boards 21 beyond the ends of which the cross members or cleats 22 project. The said parts 21, therefore, may be received between the end members of the crate, which end members comprise the parts 23 and 24 as before generally described. Cushion walls or lining members of corrugated cardboard will preferably be used in this construction substantially as previously set forth, though as shown in Figure 18, if desired, a double corrugated board may be availed of, designated 25, as the type of cushion lining member employed at the inner sides, ends, bottom, and top or cover members.

Figure 14 shows the crate with the cover or top just previous to being emplaced against the sides and end portions as when necessary to close the receptacle and just previous to banding. Figure 17 shows the final form of the receptacle after the banding is completed. Figure 16 illustrates the crate of the invention with the top or cover removed and set up at one end to act as a storage bin or container, certain groups of tiles being separated by the vertical partitions 26 of cushioning corrugated cardboard and such groups also being separated by the horizontal partitions 27 of the same material.

According to the construction of the invention in Figures 13 to 18 inclusive, it is contemplated that instead of preassembling the cushion walls upon the side and bottom slats or boards, recourse will be made to employing a carton made up of such walls substantially as shown in Figure 16, said carton being placed as a unit within the crate structure after the latter has been completely built. This type of construction may be employed wherein the carton is a unit and wherein the crate is a separate unit if desired, but it is not as economical to manufacture as the constructions previously described where the cushioning walls are glued to and form templates for the positioning of the slats or boards.

Having thus described my invention, what I claim as new and desire to secure by Letters Patent of the United States, is—

1. In a tile packaging receptacle, in combination, a crate-like structure consisting of separate side and bottom units, separate end units or members, said units each comprising a cushion wall member and board members applied to the cushion wall members and secured thereto, the cushion wall members constituting a lining for the receptacle, and the end members including cleat members projecting beyond the top edges of the side units when assembled at the ends of the side and bottom units, and a cover or top member comprising a board structure and cushion wall part at the inner side of the board structure and adapted to be asembled with the side and bottom and end units aforesaid, and overlapping the upper edges of the side units and disposed between the cleat projections of the opposite end units.

2. In a tile packaging receptacle, in combination, a crate-like structure consisting of separate side and bottom units, separate end units or members, said units comprising a cushion wall member and board members directly applied to the cushion wall members and secured thereto, the board members being supported and maintained in position by the cushion members with the latter members on the inner sides of the board members and forming the lining of the receptacle, end members being assembled at the ends of the side and bottom units, and a cover or top member comprising a board structure and cushion wall part at the inner side of the board structure and adapted to be assembled with the side and bottom and end units aforesaid, the cushion wall parts for the side and bottom units extending intermediate the board members and the adjacent edge portions of the end units.

3. As a new article of manufacture, a crate structure which comprises side and bottom units, each unit made up of cushion walls of corrugated cardboard to form a lining member for the receptacle, together with a series of slats adhesively secured to the outside of the cushion walls and supported and maintained in position by the cardboard walls, end members for the receptacle at the ends of said side and bottom units, nailing means securing the end members to the side and bottom units, and a detachable cover unit for closing the receptacle and located intermediate the end units and cooperating with the side units for such purpose.

4. A packaging receptacle for the shipment of tiles and similar frangible articles of manufacture, said receptacle comprising a combination crate and cushion body therein, the said crate and cushion body being made up of separate side and bottom units, each separate unit consisting of a cushion wall member with board members fastened to the cushion wall member and held by the fastening means thereon in the proper relative positions which they will assume when embodied in the receptacle structure, separate end units including cleat members projecting beyond the edges of the side units when the said various side, bottom, and end units are assembled edge for edge with the end members at the end edge portions of the side and bottom members, so that the board members constitute the crate structure and so that the cushion wall members constitute the cushion body structure of the receptacle, the board members being exterior thereto, fastenings passing through the adjacent ends and edges of the side, bottom, and end members for connecting them together to produce the combination crate and cushion body receptacle, a cover or top member adapted to be mounted on the assembled side, bottom, and end units and overlapping the edges of the side units and disposed between the cleat projections of the opposite end units, and means for removably fastening the cover member in assembled relation with the side, bottom, and end units.

NOBLE C. BUTLER.